United States Patent [19]
West

[11] Patent Number: 6,011,833
[45] Date of Patent: Jan. 4, 2000

[54] TALKING BOUQUET

[75] Inventor: James H. West, Vero Beach, Fla.

[73] Assignee: Florafax International, Inc, Vero Beach, Fla.

[21] Appl. No.: 09/132,397

[22] Filed: Aug. 11, 1998

[51] Int. Cl.[7] .................................................. H04M 1/64

[52] U.S. Cl. ................................. 379/88.25; 379/88.12; 705/26

[58] Field of Search .......................... 379/88.22–88.26, 379/70, 74, 88.12; 705/26

[56] References Cited

U.S. PATENT DOCUMENTS

| | | | |
|---|---|---|---|
| 5,251,251 | 10/1993 | Barber et al. | 379/357 |
| 5,425,078 | 6/1995 | Stern | 379/88.23 |
| 5,444,767 | 8/1995 | Goetchews et al. | 379/88.28 |
| 5,828,732 | 10/1998 | Gow | 379/144 |

*Primary Examiner*—Fan S. Tsang

[57] ABSTRACT

A service enabling a sending party to arrange through use of an organization offering this service for physical delivery of a gift such as a bouquet of flowers to a receiving party, the gift being accompanied by a card which directs the receiving party to receive by telephone a recorded personalized message from the sending party.

6 Claims, 1 Drawing Sheet

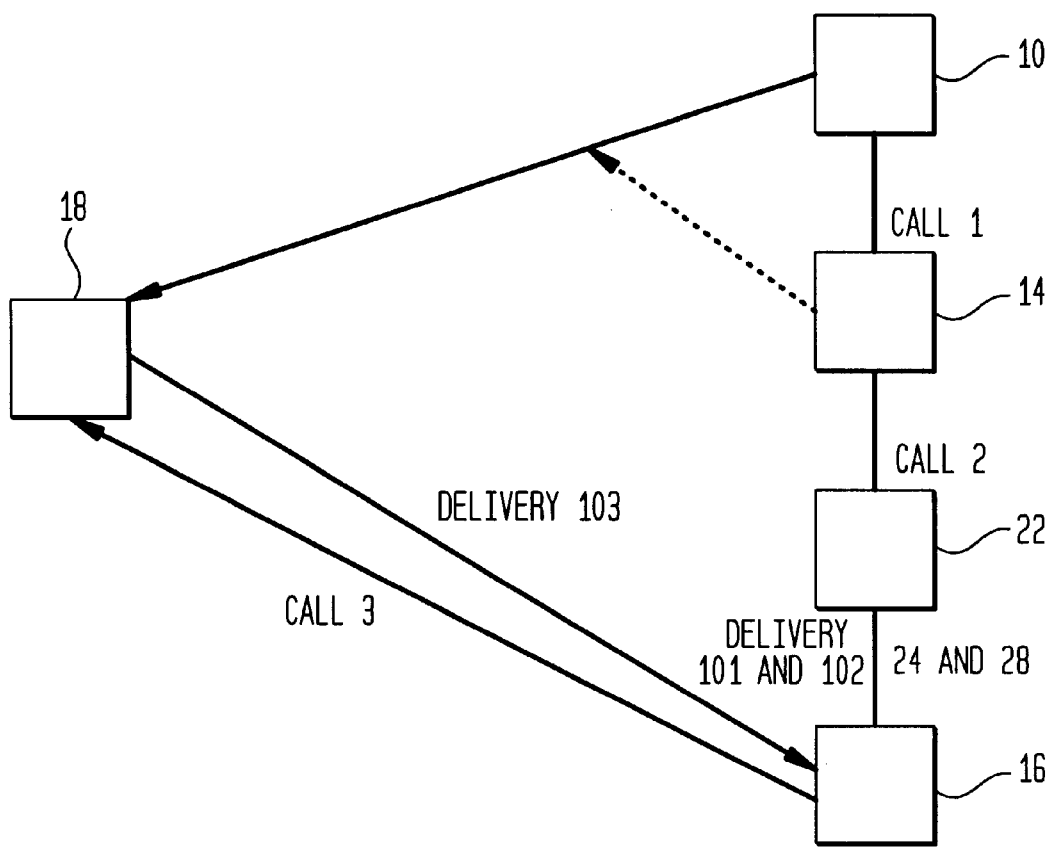

TALKING BOUQUET

BACKGROUND OF THE INVENTION

Arrangements for physical delivery of flowers from a sending party to a receiving party are well known in the art. Similarly, arrangements for delivery of personalized recorded messages from a sending party to a receiving party are also also well known.

In contradistinction to these known arrangements, the present invention is directed toward a service offered by an organization which enables a sending party to arrange for physical delivery of a gift such as a bouquet of flowers to a receiving party, the gift being accompanied by a card which directs the receiving party to receive by telephone a recorded personalized message from the sending party.

SUMMARY OF THE INVENTION

Accordingly, it is an object of the present invention to provide a new and improved service enabling a sending party to arrange through use of an organization offering this service for physical delivery of a gift such as a bouquet of flowers to a receiving party, the gift being accompanied by a card which directs the receiving party to receive by telephone a recorded personalized message from the sending party.

Another object of the present invention is to provide a new and improved service of the character indicated wherein the sending party records a personalized message in an interactive voice response computer and wherein the receiving party using the instructions on the delivered card is connected by telephone to the computer and orally receives the recorded message.

These and other objects and advantages of the invention will be explained in detail hereinafter.

In accordance with the principles of this invention, a sending party orders by telephone from a sales representative of the organization providing this service delivery of a gift to a designated receiving party and directs the representative to arrange for the sending party to prepare a personalized recorded message to the receiving party which can be received by the receiving party after delivery of the gift.

The sales representative, after explaining the method for processing the recorded message to the sending party connects the sending party to an interactive voice response computer, enabling the sending party to record the personalized message. The representative then directs a delivery agent to deliver the gift to the receiving party together with a card which informs the receiving party that a verbal message accompanies the gift and directs the receiving party to use a special telephone number to call the computer and receive the message.

A more detailed explanation of the invention follows with reference both to an accompanying drawing and to a detailed description of a preferred embodiment of the invention.

BRIEF DESCRIPTION OF THE DRAWING

The accompanying drawing is a diagramatic illustration of a preferred form of the new and improved service.

DETAILED DESCRIPTION OF PREFERRED EMBODIMENT

Referring now to the accompanying drawing, sending party 10 places a telephone call 1 to sales agent 14 of an organization providing this service. Party 10 identifies by name and address the particular receiving party 16 selected by party 10 and orders delivery to party 16 of a bouquet of flowers 24. Party 10 also requests delivery of a personalized verbal message 28 to accompany the bouquet.

The agent arranges for call 1 to be transferred to an interactive voice response computer 18 and the party 10 dictates the desired message for recording in the computer.

The agent places a telephone call 2 or fax to a delivery agent, for example a florist 22 conveniently located near the receiving party, instructing the florist to deliver the flowers 24 as shown at delivery 101 the receiving party 16. The agent also provides the florist with a telephone number to be written on a card 28 which is delivered by delivery 102 to party 16 together with the bouquet. The card contains an identification of the number assigned by the sales agent to identify the particular delivery as well as a telephone number and contains instructions to the receiving party to call this number and identify the number of the delivery whereby the personalized message previously recorded in the computer will be delivered as an audio message to the receiving party.

Party 16 then calls this number call 103 and is connected at 26 to the computer to receive the message. The party 10 upon being connected to the computer will receive step by step instructions how to record the message and the card will receive step by step instructions on how to receive the message.

If desired, both the sending and receiving parties can receive a written description explaining the entire process.

The sending party may request that the personalized message should not be recorded immediately, but rather at some time later. In this situation, the agent will give this party a no charge 800 type telephone number which can be used by the party to record a message at any future convenient time. The sending party can also use this number to change or modify a previously recorded verbal message.

While the invention has been described in detail with reference to the drawing and to the preferred embodiment, the protection solicited is to be limited only by the terms of the claims which follow.

What is claimed is:

1. A service offered by an organization having a sales agent and a delivery agent for delivering a physical gift from a sending party S to a receiving party R together with a written instruction to R providing telephone access to a recorded message from S, said service employing the following steps:

S places a first telephone call to the sales agent requesting delivery of said gift to a suitably identified R and also requesting the sales agent to arrange for S to dictate a recorded message to R;

the sales agent transfers said telephone call to a suitable recording mechanism whereby S dictates a suitable message to R;

the sales agent prepares a written card instructing R to place a second telephone call to said mechanism whereby R will orally receive the recorded message;

the sales agent instructs a delivery agent to deliver the gift and the card to R; and R receives the gift and card and places the second telephone call to receive the message.

2. The service set forth in claim 1 wherein the recording mechanism is an interactive voice response computer.

3. The service as set forth in claim 2 wherein the sales agent assigns a number which identifies the particular delivery and arranges for the written card to bear this number as well as instructions concerning the second telephone number.

4. The service as set forth in claim 3 wherein S receives step by step instructions from the agent concerning recording of the message.

5. The service as set forth in claim 4 wherein the card contains step by step instructions for R to receive the message.

6. The service of claim 5 wherein both R and S receive a written description explaining the entire process.

* * * * *